United States Patent
Tan

(10) Patent No.: US 10,354,125 B2
(45) Date of Patent: Jul. 16, 2019

(54) PHOTOGRAPH PROCESSING METHOD AND SYSTEM

(71) Applicant: TENCENT TECHNOLOGY (SHENZHEN) COMPANY LIMITED, Shenzhen (CN)

(72) Inventor: Guofu Tan, Shenzhen (CN)

(73) Assignee: TENCENT TECHNOLOGY(SHENZHEN) COMPANY LIMITED, Shenzhen (CN)

(*) Notice: Subject to any disclaimer, the term of this patent is extended or adjusted under 35 U.S.C. 154(b) by 18 days.

(21) Appl. No.: 15/713,990

(22) Filed: Sep. 25, 2017

(65) Prior Publication Data
US 2018/0012066 A1 Jan. 11, 2018

Related U.S. Application Data

(63) Continuation of application No. PCT/CN2016/101588, filed on Sep. 10, 2016.

(30) Foreign Application Priority Data

Dec. 16, 2015 (CN) .......................... 2015 1 0943006

(51) Int. Cl.
*G06K 9/00* (2006.01)
*G06T 5/00* (2006.01)
(Continued)

(52) U.S. Cl.
CPC ..... *G06K 9/00281* (2013.01); *G06K 9/00597* (2013.01); *G06T 5/008* (2013.01);
(Continued)

(58) Field of Classification Search
None
See application file for complete search history.

(56) References Cited

U.S. PATENT DOCUMENTS 6,278,491 B1    8/2001  Wang et al.
7,079,158 B2 *  7/2006  Lambertsen ......... A45D 44/005
                                                345/592
(Continued)

FOREIGN PATENT DOCUMENTS

CN    101236602 A    8/2008
CN    102348112 A    2/2012
(Continued)

OTHER PUBLICATIONS

The State Intellectual Property Office of the People's Republic of China (SIPO) Office Action 1 for 201510943006.7 dated Nov. 5, 2018 10 Pages (including translation).
(Continued)

*Primary Examiner* — Andrae S Allison
(74) *Attorney, Agent, or Firm* — Anova Law Group, PLLC

(57) ABSTRACT

Embodiments of the present invention provide a photograph processing method and system. The method includes: performing face detection on a photograph to obtain a detected human face; performing alignment on the detected human face, so as to obtain contour points of a left eye and a right eye of the detected human face; separately calculating a left eye area, being an area of the left eye, and a right eye area, being an area of the right eye, according to the contour points of the left eye and the right eye; performing stretching transformation on each pixel in the left eye area and the right eye area to generate a stretched left eye area and a stretched right eye area; and performing histogram equalization processing on the stretched left eye area and the stretched right eye area, so as to generate a processed photograph.

20 Claims, 8 Drawing Sheets

(51) Int. Cl.
*G06T 11/00* (2006.01)
*G06T 11/60* (2006.01)

(52) U.S. Cl.
CPC .............. *G06T 11/00* (2013.01); *G06T 11/60* (2013.01); *G06K 9/00255* (2013.01); *G06T 2207/10024* (2013.01); *G06T 2207/30201* (2013.01)

(56) References Cited

U.S. PATENT DOCUMENTS

| | | | | |
|---|---|---|---|---|
| 7,376,346 | B2 * | 5/2008 | Merola | A61B 5/0071 348/77 |
| 8,265,351 | B2 * | 9/2012 | Aarabi | G06K 9/00234 382/118 |
| 9,760,935 | B2 * | 9/2017 | Aarabi | G06Q 30/0631 |
| 2003/0065255 | A1 * | 4/2003 | Giacchetti | A45D 44/005 600/407 |
| 2005/0063582 | A1 * | 3/2005 | Park | G06T 17/10 382/154 |
| 2006/0204058 | A1 * | 9/2006 | Kim | G06K 9/00288 382/118 |
| 2007/0058858 | A1 * | 3/2007 | Harville | A45D 44/005 382/165 |
| 2008/0267443 | A1 * | 10/2008 | Aarabi | G06K 9/00234 382/100 |
| 2011/0091071 | A1 * | 4/2011 | Sabe | G06K 9/00281 382/103 |
| 2013/0129210 | A1 * | 5/2013 | Na | G06Q 30/02 382/165 |
| 2013/0163861 | A1 * | 6/2013 | Mariatos | G06T 1/20 382/162 |
| 2015/0055085 | A1 * | 2/2015 | Fonte | G06Q 30/0621 351/178 |
| 2015/0339757 | A1 * | 11/2015 | Aarabi | G06Q 30/06 705/12 |

FOREIGN PATENT DOCUMENTS

| | | |
|---|---|---|
| CN | 102682420 A | 9/2012 |
| CN | 103745429 A | 4/2014 |
| CN | 104657974 A | 5/2015 |
| CN | 104966280 A | 10/2015 |

OTHER PUBLICATIONS

Yang Ci-Yin et al. "Contrast enhancement of medical image based on sine grey level transformation", Optical Technique, vol. 28, No. 5; Sep. 30, 2002 (Sep. 30, 2002), p. 407-408.

The World Intellectual Property Organization (WIPO) International Search Report for PCT/CN2016/101588 dated Jan. 16, 2017 6 Pages.

* cited by examiner

PHOTOGRAPH PROCESSING METHOD AND SYSTEM

RELATED APPLICATION

This application is a continuation application of PCT Patent Application No. PCT/CN2016/101588, filed on Oct. 9, 2016, which claims priority to Chinese Patent Application No. 201510943006.7, filed with the Chinese Patent Office on Dec. 16, 2015, entitled "PHOTOGRAPH PROCESSING METHOD AND SYSTEM", the entire content of both of which is incorporated herein by reference.

FIELD OF THE TECHNOLOGY

The present disclosure relates to the field of image processing and, in particular, to a photograph processing method and system.

BACKGROUND OF THE DISCLOSURE

Along with the popularity of digital cameras and smartphones, more and more pictures are taken by such devices. However, the effect of photographs taken may be affected by various factors, such as light, photography instrument, personal appearance, shooting angle, shooting posture, and lens distortion. Eyes are always regarded as windows to the soul, and are one of the most important parts of portrait photography. Therefore, adjustment is often made on eyes during post-processing of a photograph.

Currently, common processing methods are as follows:

1. Using professional software such as Photoshop to do the processing. However, such a method requires an operator to have high professional expertise and involves complex operations, and is particularly time-and-labor-consuming when there are a large quantity of photographs to be processed.

2. Using smart software applications such as Meitu to do the processing. Although such a method is easy to operate, the effect of processing on eyes usually causes distortion. In addition, such a method is also not suitable for processing of a large quantity of photographs.

SUMMARY

In view of the above technical problems, an objective of the present disclosure is to provide a photograph processing method and system, so as to resolve technical problems of high professional expertise, complex operations, distortion of processing effect, and being time-and-labor-consuming when processing a large quantity of photographs in the existing technology.

To resolve the foregoing technical problems, embodiments of the present invention provide a photograph processing method, including: performing face detection on a photograph to obtain a detected human face; performing alignment on the detected human face, so as to obtain contour points of a left eye and a right eye of the detected human face; separately calculating a left eye area, being an area of the left eye, and a right eye area, being an area of the right eye, according to the contour points of the left eye and the right eye; performing stretching transformation on each pixel in the left eye area and the right eye area to generate a stretched left eye area and a stretched right eye area; and performing histogram equalization processing on the stretched left eye area and the stretched right eye area, so as to generate a processed photograph.

To resolve the foregoing technical problems, the embodiments of the present invention further provide a photograph processing system. The photograph processing system includes a memory storing instructions; and a processor coupled to the memory. When executing the instructions, the processor is configured for: performing face detection on a photograph to obtain a detected human face; performing alignment on the detected human face, so as to obtain contour points of a left eye and a right eye of the detected human face; separately calculating a left eye area, being an area of the left eye, and a right eye area, being an area of the right eye, according to the contour points of the left eye and the right eye; performing stretching transformation on each pixel in the left eye area and the right eye area to generate a stretched left eye area and a stretched right eye area; and performing histogram equalization processing on the stretched left eye area and the stretched right eye area, so as to generate a processed photograph.

To resolve the foregoing technical problems, the embodiments of the present invention further provide a non-transitory computer-readable storage medium, which contains computer-executable instructions for, when executed by a processor, performing a photograph processing method. The method includes: performing face detection on a photograph to obtain a detected human face; performing alignment on the detected human face, so as to obtain contour points of a left eye and a right eye of the detected human face; separately calculating a left eye area, being an area of the left eye, and a right eye area, being an area of the right eye, according to the contour points of the left eye and the right eye; performing stretching transformation on each pixel in the left eye area and the right eye area to generate a stretched left eye area and a stretched right eye area; and performing histogram equalization processing on the stretched left eye area and the stretched right eye area, so as to generate a processed photograph.

Other aspects of the present disclosure can be understood by those skilled in the art in light of the description, the claims, and the drawings of the present disclosure.

DESCRIPTION OF EMBODIMENTS

Figure 1:
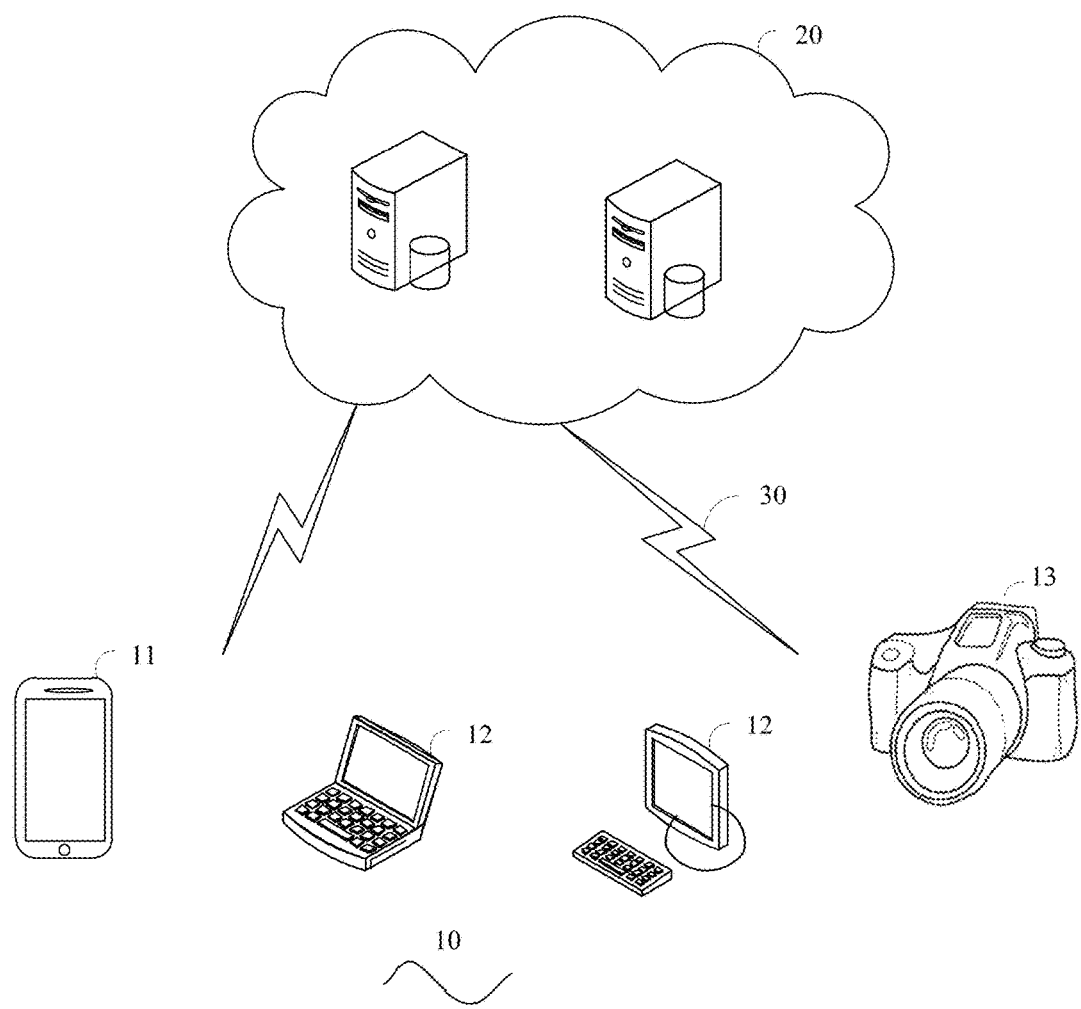
FIG. 1 is a schematic diagram of an application environment of a photograph processing method and system according to embodiments of the present invention.

Referring to the drawings in the accompanying drawings, same component symbols represent same components. The principle of the present disclosure is described by way of example in a proper computing environment. The following descriptions are specific embodiments of the present invention based on the examples, and should not be construed as a limitation to other embodiments of the present invention that are not described herein in detail.

That is, the principle of the present disclosure does not represent as a limitation, and a person skilled in the art may be able to learn that multiple following steps and operations may also be implemented in hardware. The principle of the present disclosure is performed by using many other general-purpose or specific-purpose operations, communications environment, or configurations.

FIG. 1 is a schematic diagram of an application environment of a photograph processing method and system according to embodiments of the present invention. Referring to FIG. 1, the application environment includes a terminal device 10, a cloud service platform 20, and a communications network 30.

It can be understood that the terminal device 10, such as a mobile phone 11, a computer 12, or a camera 13, and other terminal devices with a photograph storage function, may be installed with or linked, by using a web page, to the processing method or processing system provided in the present disclosure, so as to beautify photographs.

The cloud service platform 20 is configured to provide the photograph processing method and system according to the embodiments of the present invention by providing an application package or by means of a web page link.

That is, a processing process of the embodiments of the present invention may be implemented in the terminal device 10 by downloading an application package, or may be implemented on the cloud service platform 20 by means of a web page link.

The processing process is briefly described as follows: performing face detection on a photograph; performing alignment on a detected human face, so as to obtain contour points of two eyes; separately calculating a left eye area and a right eye area according to the contour points of the two eyes; performing stretching transformation on each pixel in the left eye area and the right eye area; and performing histogram equalization processing on the stretched left eye area and the stretched right eye area, so as to generate a processed photograph.

The communications network 30 is configured to provide a data transmission channel between the terminal device 10 and the cloud service platform 20, and includes a wireless network and a wired network. The wireless network includes one or a combination of more than one of a wireless wide area network, a wireless local area network, a wireless metropolitan area network, or a wireless personal area network.

The solution may be applied to an open platform of Tencent YouTu to process a photograph, so as to form an effect of improved eye appearance. Referring to the following embodiments, a photograph processing method, a photograph processing system, and an effect of a photograph processing method and system are illustrated. It can be understood that the various embodiments all have consistent design ideas. Furthermore, for a part that is not described in detail in an embodiment, such detailed description may be obtained from the entire specification, and features in the various embodiments may be combined or replaced.

Figure 2:
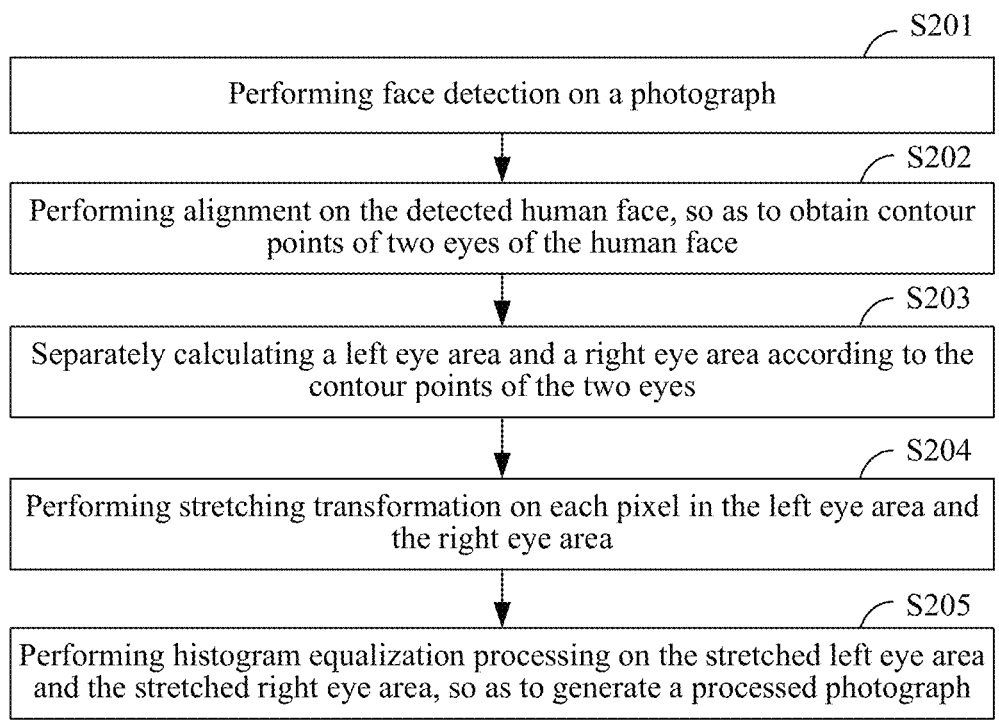
FIG. 2 is a schematic flowchart of a photograph processing method according to an embodiment of the present invention.

FIG. 2 is a basic schematic flowchart of a photograph processing method. The photograph processing method is usually executed in a terminal device. Referring to FIG. 2, the photograph processing method includes the followings.

S201, performing face detection on a photograph or image.

Performing detection on a human face is to detect positions of all human faces and corresponding face attributes in a specified image. The specified image may be a local image or a network connection address, and the processing may be on a single image, or batch processing.

Specifically, the face detection may include the followings.

1. performing detection on the image to determine the position of the human face (x, y, w, h), so as to describe the position, the width, and the height of a human face frame, such as an upper left corner horizontal coordinate x of the human face frame, an upper left corner vertical coordinate y of the human face frame, the width of the human face frame, and the height of the human face frame.

2. detecting the face attributes according to the position of the human face, the face attributes including but not limited to one of gender, age, expression, posture (pitch, roll, and yaw), or glasses.

In addition, the face detection may further include the followings.

3. detecting whether a mode of the photograph is a normal mode, where an abnormal mode is usually a big face mode, and, for example, a common big face mode is an ID photograph or a selfie.

4. detecting the number of the human faces in the photograph to determine whether to process all the human faces in the photograph.

S202, performing alignment on the detected human face, so as to obtain contour points of two eyes of the human face.

Specifically, the step of alignment includes:

1. locating facial features of the human face and calculating contour points constituting the human face. For example, 88 contour points are used, including eyebrows (8 points at both left and right), eyes (8 points at both left and right), a nose (13 points), a mouth (22 points), and a face profile (21 points). It can be understood that, the contour points used as an example herein should not be regarded as a limitation to the present disclosure; the number of the contour points may be increased or reduced and positions of the contour points may be re-planned as required.

2. extracting contour points of a left eye and contour points of a right eye from the contour points.

In the above example, eight contour points at both the left and the right are used, and an x value (x-axis coordinate) and a y value (y-axis coordinate) of each of the eight contour points of the left eye and an x value and a y value of each of the eight contour points of the right eye are obtained.

S203, separately calculating a left eye area and a right eye area according to the contour points of the two eyes.

S204, performing stretching transformation on each pixel in the left eye area and the right eye area.

Specifically, the following steps are included:

1. decomposing each pixel in the left eye area and the right eye area into a red attribute value, a green attribute value, and a blue attribute value; and 2. performing stretching transformation on the red attribute value, the green attribute value, and the blue attribute value to generate a stretched left eye area and a stretched right eye area.

The step of stretching transformation specifically includes:

2.1. obtaining original color attribute values. For example, the color attribute values may include red, green, or blue. In one embodiment, the decomposed red attribute value, green attribute value, and blue attribute value may be used as the original color attribute values.

2.2. separately inserting the original color attribute values into a sine function to perform stretching, so as to generate stretched color attribute values. A transformation function formed by the sine function is:

$$F(c)=(\sin((c+1.57)*3)+1)/2 \quad 0=<c=<1;$$

where F(c), being a transformation function, can perform stretching transformation on a smaller value or a larger value to scale up or enlarge the center area of the eye (e.g., the pupil of the eye) and scale down or reduce the edge area of the eye (e.g., the white area of the eye), so that the eyes are rounder and brighter. In addition, the transformation range is controllable, and the eyes will not be too large to cause distortion; and the stretched or transformed attribute value is:

C=255*F(c/255.0), where c is the red attribute value, the green attribute value, or the blue attribute value. Taking pixels in the left eye area as an example, original RGB channel values of a pixel are rgb, so that the transformed RGB values are:

R=255*F(r/255.0)
G=255*F(g/255.0)
B=255*F(b/255.0)

2.3. separately forming the stretched left eye area and the stretched right eye area according to the stretched color attribute values.

S205, performing histogram equalization processing on the stretched left eye area and the stretched right eye area, so as to generate a processed photograph.

By means of the histogram equalization processing, gray scales with a larger number of pixels in the left eye area and the right eye area are broadened, and gray scales with a smaller number of pixels are compressed, thereby expanding the dynamic range of the original pixels, and improving contrast and variation of gray scale tone, so that the stretched photograph is clearer.

In the photograph processing method provided in this embodiment of the present invention, a left eye area and a right eye area are calculated from a detected human face, and then stretching transformation is performed on each pixel in the eye areas, so as to generate a processed photograph, having an effect of automatically beautifying the eyes without the need for manual operation. In addition, the processing effect is within a controllable range and distortion is not easy to occur.

Figure 3:
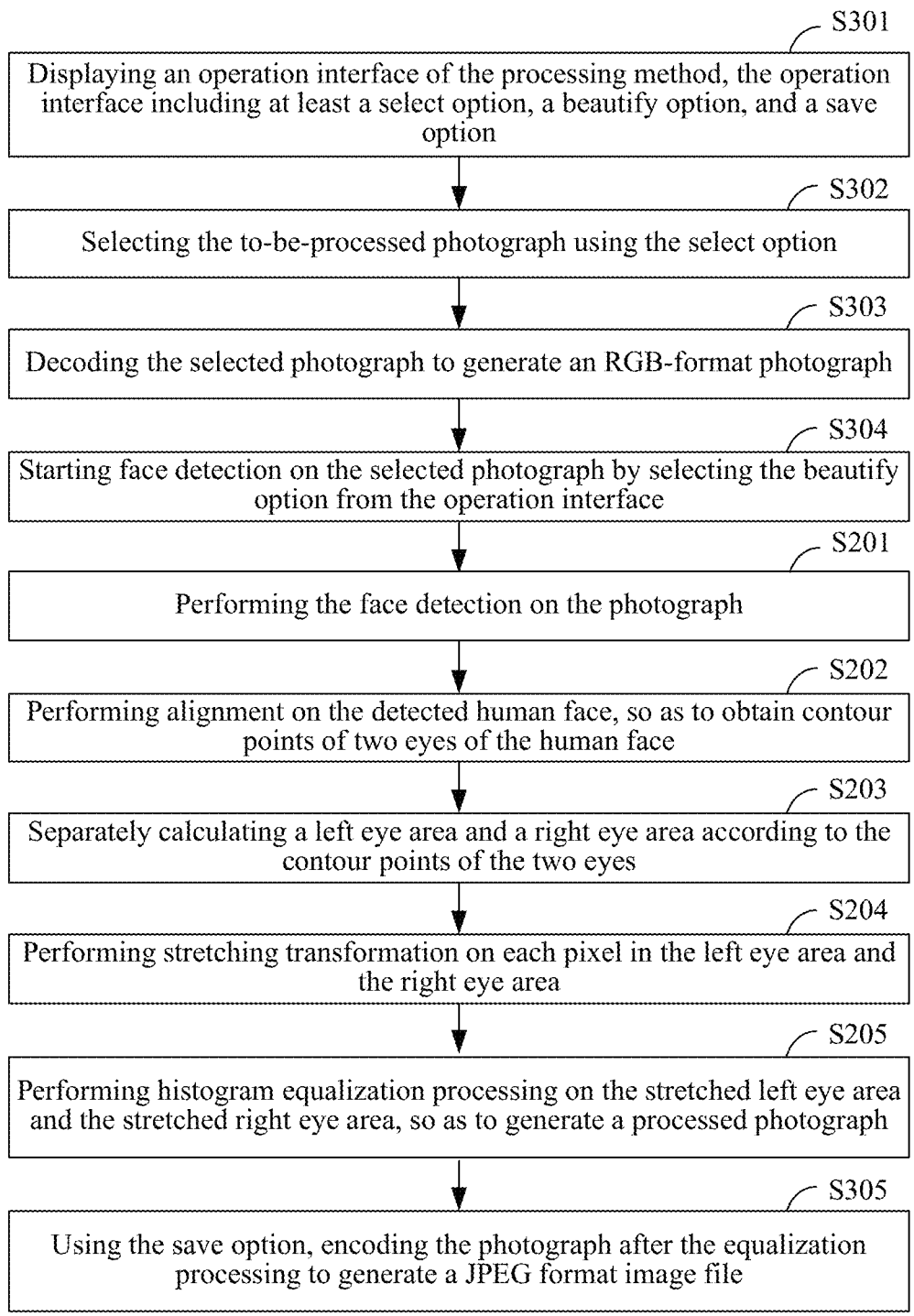
FIG. 3 is a schematic flowchart of a photograph processing method according to another embodiment of the present invention.

In another embodiment of the present disclosure, a photograph processing method is provided. FIG. 3 is a detailed schematic flowchart of a photograph processing method. The photograph processing method may be executed in a terminal device or a cloud service platform. Referring to FIG. 3, including the steps shown in FIG. 2, the photograph processing method includes the followings.

S301, displaying an operation interface of the processing method, the operation interface including at least a select option, a beautify option, and a save option.

It can be understood that this is supplemental to the automatic beautification provided in the above embodiments. That is, selecting a to-be-processed photograph is performed by a user manually, so that a waste of processing resources caused by processing excessive photographs by a terminal device can be effectively reduced.

S302, selecting the to-be-processed photograph using the select option.

It can be understood that the to-be-processed photograph may be selected by selecting a single photograph, a batch of photographs, a local photograph, or a network photograph, etc.

S303, decoding the selected photograph to generate an RGB-format photograph.

The RGB format, also referred to as a color mode, obtains various colors by changing three color channels of red (R), green (G), and blue (B), and overlay among them. RGB represents colors of the three channels of red, green, and blue. Such a standard almost includes all colors that can be perceived by human eyes, and is one of the current most widely used color systems.

S304, starting face detection on the selected photograph by selecting the beautify option from the operation interface.

In this step, the beautify option is mainly to beautify the eyes, and may also include other beautifying steps, such as beautifying skin or removing moles. Details are not further described herein.

S201, performing the face detection on the photograph.

Performing detection on a human face is to detect a position of the human face in photograph, corresponding face attributes, the mode of the photograph, the number of the human faces, and so on.

S202, performing alignment on the detected human face, so as to obtain contour points of two eyes of the human face.

Specifically, the step of alignment includes:

1. locating facial features of the human face and calculating contour points constituting the human face.

2. extracting contour points of a left eye and contour points of a right eye from the contour points.

S203, separately calculating a left eye area and a right eye area according to the contour points of the two eyes.

S204, performing stretching transformation on each pixel in the left eye area and the right eye area.

Specifically, the following steps are included:

1. decomposing each pixel in the left eye area and the right eye area into a red attribute value, a green attribute value, and a blue attribute value.

2. performing stretching transformation on the red attribute value, the green attribute value, and the blue attribute value to generate a stretched left eye area and a stretched right eye area.

The step of stretching transformation specifically includes:

2.1. obtaining original color attribute values. For example, the color attribute values may include red, green, or blue;

2.2. separately inserting the original color attribute values into a sine function to perform stretching, so as to generate stretched color attribute values. A transformation function formed by the sine function is:

$$F(c)=(\sin((c+1.57)*3)+1)/2 \quad 0=<c=<1;$$

where F(c), being a transformation function, can perform stretching transformation on a smaller value or a larger value to scale up or enlarge the center area of the eye and scale down or reduce the edge area of the eye, so that the eyes are rounder and brighter. In addition, the transformation range is controllable, and the eyes will not be too large to cause distortion; and the stretched or transformed attribute value is:

C=255*F(c/255.0), where c is the red attribute value, the green attribute value, or the blue attribute value. Taking pixels in the left eye area as an example, original RGB channel values of a pixel are rgb, so that the transformed RGB values are:

R=255*F(r/255.0)
G=255*F(g/255.0)
B=255*F(b/255.0)

2.3. separately forming the stretched left eye area and the stretched right eye area according to the stretched color attribute values.

S205, performing histogram equalization processing on the stretched left eye area and the stretched right eye area, so as to generate a processed photograph.

By means of the histogram equalization processing, gray scales with a larger number of pixels in the left eye area and the right eye area are broadened, and gray scales with a smaller number of pixels are compressed, thereby expanding the dynamic range of the original pixels, and improving contrast and variation of gray scale tone, so that the stretched photograph is clearer.

S305, by using the save option from the operation interface, encoding the photograph after the equalization processing to generate a JPEG format image file.

The JPEG is an acronym of Joint Photographic Experts Group and represents a widely-used standard method for compressing an image. Extension names for such format include .jpeg, .jfif, .jpg, .JPG, or .JPE. It can be understood that the foregoing is merely examples of the format of the photographs formed eventually and should not be understood as a limitation to the format.

In the photograph processing method provided in this embodiment of the present invention, a left eye area and a right eye area are calculated from a detected human face, and then stretching transformation is performed on each pixel in the eye areas, so as to generate a processed photograph, having an effect of automatically beautifying the eyes without the need for manual operation. In addition, the processing effect is within a controllable range and distortion is not easy to occur.

Figure 4:
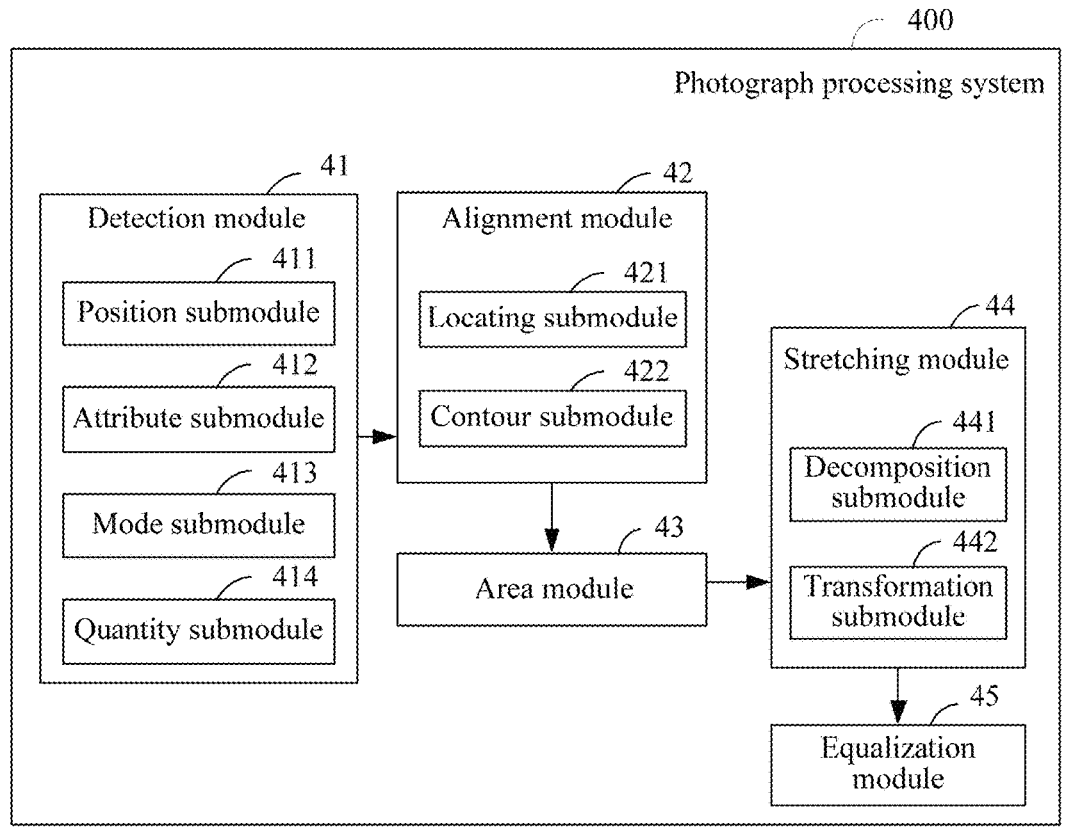
FIG. 4 is a schematic diagram of modules of a photograph processing system according to another embodiment of the present invention.

In another embodiment of the present disclosure, a basic system for a photograph processing method is provided. FIG. 4 is a schematic diagram of photograph processing system. The photograph processing system usually performs execution in a terminal device.

Referring to FIG. 4, the photograph processing system 400 includes a detection module 41, an alignment module 42, an area module 43, a stretching module 44, and an equalization module 45, etc.

The detection module 41 is configured to perform face detection on a photograph to detect positions of all human faces and corresponding face attributes in a specified image.

The detection module 41 includes a position sub-module 411, an attribute sub-module 412, a mode sub-module 413, and a quantity sub-module 414.

Specifically, the position sub-module 411 is configured to perform detection on the photograph to determine the position of the human face (x, y, w, h), so as to describe a position, the width, and the height of a human face frame, such as an upper left corner horizontal coordinate x of the human face frame, an upper left corner vertical coordinate y of the human face frame, the width of the human face frame, and the height of the human face frame.

The attribute sub-module 412 is configured to detect face attributes according to the position of the human face. The face attributes include but are not limited to one of gender, age, expression, posture (pitch, roll, and yaw), or glasses.

The mode sub-module 413 is configured to detect whether a mode of the photograph is a normal mode, where an abnormal mode is usually a big face mode, and, for example, a common big face mode is an ID photograph or a selfie.

The quantity sub-module 414 is configured to detect the number of the human faces in the photograph to determine whether to process all the human faces in the photograph.

The alignment module 42 connected to the detection module 41 is configured to perform alignment on the detected human face, so as to obtain contour points of two eyes of the detected human face.

The alignment module 42 includes a locating sub-module 421 and a contour sub-module 422.

Specifically, the locating sub-module 421 is configured to locate facial features of the human face and calculate contour points constituting the human face.

The contour sub-module 422 is connected to the locating sub-module 421 and is configured to extract coordinate values of contour points of a left eye and coordinate values of contour points of a right eye from the contour points.

The area module 43 is connected to the alignment module 42 and is configured to separately calculate a left eye area and a right eye area according to the contour points of the two eyes.

The stretching module 44 is connected to the area module 43 and is configured to perform stretching transformation on each pixel in the left eye area and the right eye area.

The stretching module 44 includes a decomposition sub-module 441 and a transformation sub-module 442.

Specifically, the decomposition sub-module 441 is configured to decompose each pixel in the left eye area and the right eye area into a red attribute value, a green attribute value, and a blue attribute value.

The transformation sub-module 442 is connected to the decomposition sub-module 441 and is configured to perform stretching transformation on the red attribute value, the green attribute value, and the blue attribute value to generate a stretched left eye area and a stretched right eye area.

Specifically, the transformation sub-module 442 is configured to obtain original color attribute values, the color attribute values including: red, green, or blue; separately insert the original color attribute values into a sine function to perform stretching, so as to generate stretched color attribute values; and separately form the stretched left eye area and the stretched right eye area according to the stretched color attribute values.

A transformation function formed by the sine function is:

$$F(c)=(\sin((c+1.57)*3)+1)/2 \quad 0=<c=<1;$$

and the stretched attribute value is:

C=255*F(c/255.0), c being the red attribute value, the green attribute value, or the blue attribute value.

By means of the above stretching, the center area of the eye is scaled up and an edge area of the eye is scaled down, so that the eye is rounder and brighter. In addition, a transformation range is controllable, and the eyes will not be so large as to cause distortion.

Taking pixels in the left eye area as an example, original R (red) G (green) B (blue) channel values of a pixel are r, g, b, so that transformed RGB values are:

R=255*F(r/255.0), G=255*F(g/255.0), B=255*F(b/255.0)

The equalization module 45 is connected to the stretching module 44 and is configured to perform histogram equalization processing on a stretched left eye area and a stretched right eye area, so as to generate a processed photograph.

By means of the histogram equalization processing, gray scales with a larger number of pixels in the left eye area and the right eye area are broadened, and gray scales with a smaller number of pixels are compressed, thereby expanding the dynamic range of the original pixels, and improving contrast and variation of gray scale tone, so that the stretched photograph is clearer.

The photograph processing system provided in this embodiment of the present invention calculates a left eye area and a right eye area from a detected human face, and then performs stretching transformation on each pixel in the areas, so as to generate a processed photograph, having an effect of automatically beautifying the eyes without the need for manual operation. In addition, the processing effect is within a controllable range and distortion is not easy to occur.

Figure 5:
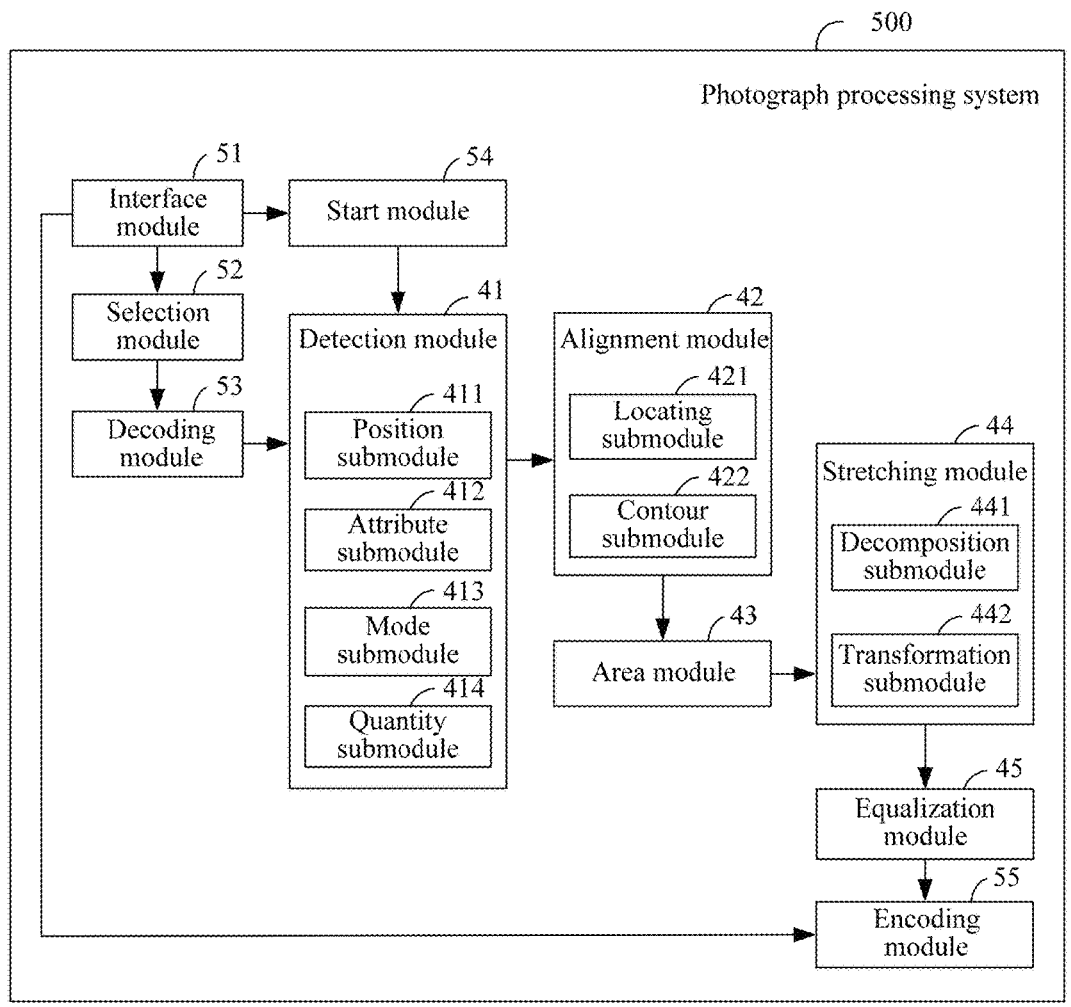
FIG. 5 is a schematic diagram of modules of a photograph processing system according to another embodiment of the present invention.

In another embodiment of the present disclosure, a photograph processing system is provided. FIG. 5 is a detailed schematic diagram of a photograph processing system. The photograph processing system may perform execution in a terminal device, or a cloud service platform.

Referring to FIG. 5, including the various modules shown in FIG. 4, the photograph processing system 500 includes an interface module 51, a selection module 52, a decoding module 53, a start module 54, a detection module 41, an alignment module 42, an area module 43, a stretching module 44, an equalization module 45, and an encoding module 55.

The interface module 51 is configured to display an operation interface of the processing system, the operation interface including a select option, a beautify option, and a save option.

It can be understood that the interface module 51 supplements to the automatic beautification provided in the above embodiment. That is, selecting a to-be-processed photograph is performed by a user manually, so that a waste of processing resources caused by processing excessive photographs by a terminal device can be effectively reduced.

The selection module 52 is connected to the interface module 51 and is configured to select the to-be-processed photograph using the select option on the operation interface.

It can be understood that the to-be-processed photograph may be selected by selecting a single photograph, a batch of photographs, a local photograph, or a network photograph, etc.

The decoding module 53 is connected to the selection module 52 and is configured to decode the selected photograph to generate an RGB format photograph.

The RGB format, also referred to as a color mode, obtains various colors by changing three color channels of red (R), green (G), and blue (B), and overlay among them. RGB represents colors of the three channels of red, green, and blue. Such a standard almost includes all colors that can be perceived by human eyes, and is one of the current most widely used color systems.

The start module 54 is connected to the interface module 51 and is configured to start face detection on the selected photograph using the beautify option.

The beautify option is mainly to beautify the eyes, and may also include other beautifying steps, such as beautifying skin or removing moles. Details are not further described herein.

The detection module 41 is connected to the start module 54 and the decoding module 53, and is configured to perform face detection on the photograph to detect positions of all human faces and corresponding face attributes in a specified image.

Specifically, the detection module 41 includes: a position sub-module 411 configured to perform detection on the photograph to determine a position of the human face (x, y, w, h); an attribute sub-module 412 configured to detect face attributes according to the position of the human face; a mode sub-module 413 configured to detect a mode of the photograph; and a quantity sub-module 414 configured to detect the number of the human faces in the photograph to determine whether to process all the human faces in the photograph.

The alignment module 42 is connected to the detection module 41 and is configured to perform alignment on the detected human face, so as to obtain contour points of the two eyes of the detected human face.

Specifically, the alignment module 42 includes a locating sub-module 421 configured to locate facial features of the human face and calculate contour points constituting the human face; and a contour sub-module 422 configured to extract position values (x, y) of contour points of the left eye and contour points of the right eye from the contour points.

The area module 43 is connected to the alignment module 42 and is configured to separately calculate a left eye area and a right eye area according to the contour points of the two eyes.

The stretching module 44 is connected to the area module 43 and is configured to perform stretching transformation on each pixel in the left eye area and the right eye area.

Specifically, the stretching module 44 includes: a decomposition sub-module 441, configured to decompose each pixel in the left eye area and the right eye area into a red attribute value, a green attribute value, and a blue attribute value; and a transformation sub-module 442, configured to perform stretching transformation on the red attribute value, the green attribute value, and the blue attribute value to generate a stretched left eye area and a stretched right eye area.

The transformation sub-module 442 performs stretching on the attribute values of the three colors by means of a transformation function, where the transformation function is:

$$F(c)=(\sin((c+1.57)*3)+1)/2 \ \ 0=<c=<1; \text{ and}$$

the stretched attribute value is: $C=255*F(c/255.0)$, c being the red attribute value, the green attribute value, or the blue attribute value.

The equalization module 45 is connected to the stretching module 44 and is configured to perform histogram equalization processing on a stretched left eye area and a stretched right eye area, so as to generate a processed photograph.

By means of the histogram equalization processing, gray scales with a larger number of pixels in the left eye area and the right eye area are broadened, and gray scales with a smaller number of pixels are compressed, thereby expanding the dynamic range of the original pixels, and improving contrast and variation of gray scale tone, so that the stretched photograph is clearer.

The encoding module 55 is connected to the interface module 51 and the equalization module 45, and is configured to, using the save option from the operation interface, encode the photograph after the equalization processing to generate a JPEG format image file.

The photograph processing system provided in this embodiment of the present invention calculates a left eye area and a right eye area from a detected human face, and then performs stretching transformation on each pixel in the areas, so as to generate a processed photograph, having an effect of automatically beautifying the eyes without the need for manual operation. In addition, the processing effect is within a controllable range and distortion is not easy to occur.

```
Response:
  {"face_shape": [ {
  "face_profile":[{"x":48,"y":55},{"x":49,"y":61},{"x":49,"y":66},{"x":50,"y":71},{"x":51,"y":76
  },
  {"x":54,"y":81},{"x":56,"y":86},{"x":60,"y":90},{"x":65,"y":93},{"x":71,"y":95},{"x":77,"y":9
  6},{"x":82,"y":95},{"x":87,"y":93},{"x":92,"y":90},{"x":94,"y":85},{"x":97,"y":81},{"x":99,"y
  ":76},{"x":100,"y":71},{"x":101,"y":65},{"x":101,"y":60},{"x":101,"y":55}],   //face profile
  "left_eye":[{"x":62,"y":55},{"x":64,"y":56},{"x":66,"y":57},{"x":68,"y":57},{"x":70,"y":56},{"
  x":69,"y":54},{"x":66,"y":54},{"x":64,"y":54}], //left eye profile
  "right_eye":[{"x":92,"y":55},{"x":90,"y":56},{"x":88,"y":56},{"x":86,"y":56},{"x":84,"y":56},
  {"x":85,"y":54},{"x":88,"y":53},{"x":90,"y":54}], //right eye profile
  "left_eyebrow", "right_eyebrow", "mouth", "nose" and so on are same as the above, which are
  omitted herein.
                     } ],
    "image_height":150,
    "image_width":150,
    "session_id":""
    }
```

Figure 6:
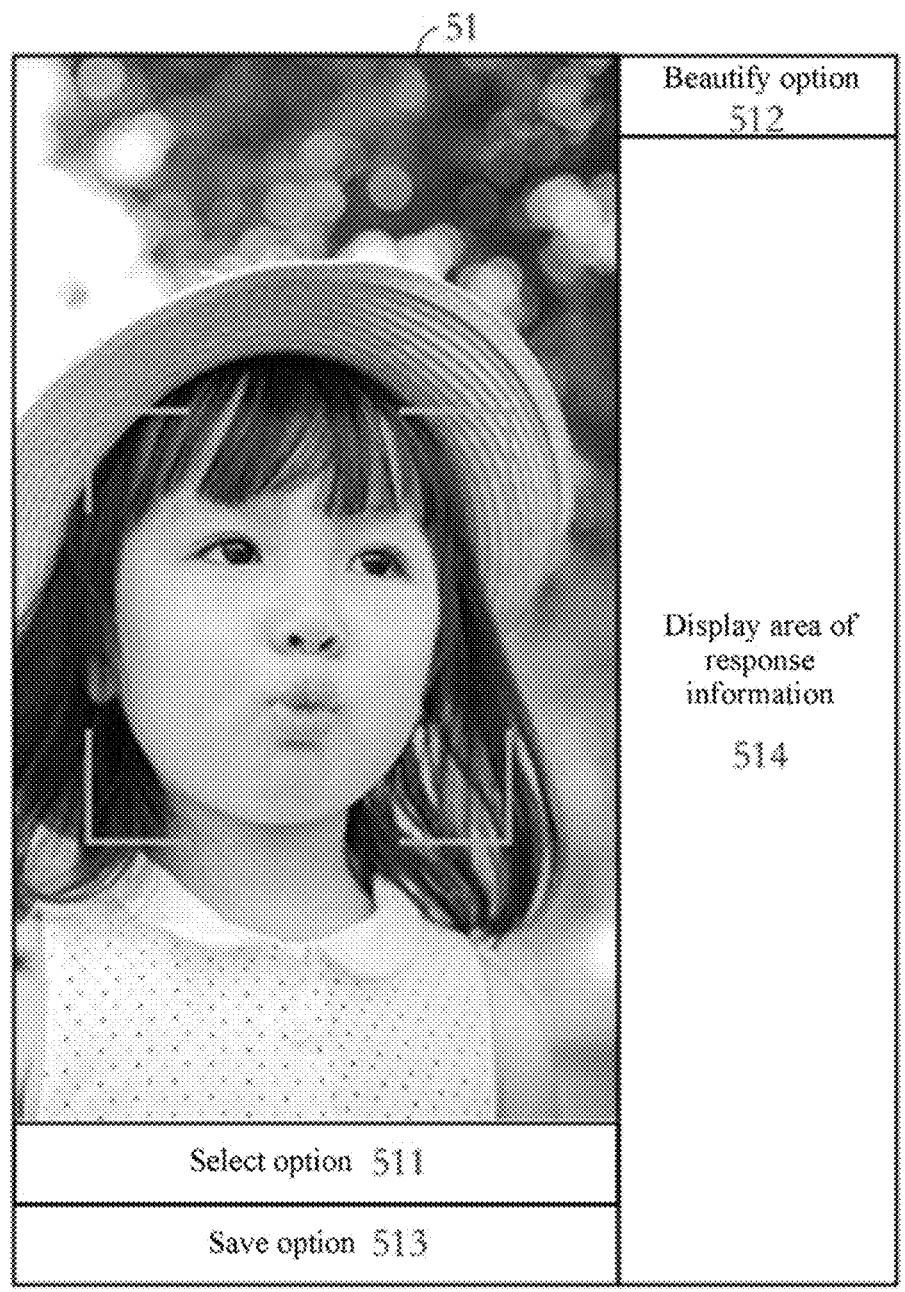
FIG. 6 is a schematic diagram of an interface of a photograph processing method and system according to another embodiment of the present invention.

In another embodiment of the present disclosure, an interface of a photograph processing method and system is provided. FIG. 6 is a schematic diagram of the interface of a photograph processing method and system. Referring to FIG. 6, the interface 51 (e.g., corresponding to the interface module 51 in FIG. 5) may include the select option 511, the beautify option 512, the save option 513, and a display area of response information 514.

The interface 51 is configured to display an operation interface of the processing system. Specifically, the select option 511 is configured to trigger the selection module 52 and the decoding module 53 in FIG. 5, so as to select a photograph and decode the photograph to generate an RGB format photograph.

The beautify option 512 is configured to trigger the start module 54, the detection module 41, the alignment module 42, the area module 43, the stretching module 44, and the equalization module 45 in FIG. 5, so as to beautify pupils of human eyes in a photograph. The position of the human face is displayed by means of a human face frame (x, y, w, h).

Figure 7:
FIG. 7 is a schematic diagram of contour points of a photograph processing method and system according to another embodiment of the present invention.

FIG. 7 is a schematic diagram of the contour points according to this embodiment of the present invention. As shown in FIG. 7, a total of 88 contour points are used as an example for description, including eyebrows (8 points at both left and right), eyes (8 points at both left and right), a nose (13 points), a mouth (22 points), and a face profile (21 points).

For example, an implementation of the photograph processing method and system may use the following request to obtain contour point information.

```
Request:
{
"app_id":"123456",    //upload person
"image":"asdfasdfasdf12312",   //name of an image or a link address
}
```

The following response may be obtained locally or from the cloud platform, where the response may be displayed in the display area 514 of response information and fine adjustment may be made by a user to the contour points; or the response may be used for only background computation and not be displayed.

The save option 513 is configured to trigger the encoding module 55 in FIG. 5 to encode the photograph after the equalization processing, so as to generate a JPEG format photograph file.

In the photograph processing method and system provided in this embodiment of the present invention, a left eye area and a right eye area are calculated from a detected human face, and then stretching transformation is performed on each pixel in the areas, so as to generate a processed photograph, having an effect of automatically beautifying the eyes without the need for manual operation. In addition, the processing effect is within a controllable range and distortion is not easy to occur.

The embodiments of the present invention further provide a storage medium. The storage medium is further configured to store program code used to perform the following steps: performing face detection on a photograph; performing alignment on a detected human face, so as to obtain contour points of two eyes; separately calculating a left eye area and a right eye area according to the contour points of the two eyes; performing stretching transformation on each pixel in the left eye area and the right eye area; and performing histogram equalization processing on the stretched left eye area and the stretched right eye area, so as to generate a processed photograph.

Optionally, the storage medium is further configured to store program code used to perform the following steps: decomposing each pixel in the left eye area and the right eye area into a red attribute value, a green attribute value, and a blue attribute value; and performing stretching transformation on the red attribute value, the green attribute value, and the blue attribute value to generate the stretched left eye area and the stretched right eye area.

Optionally, the storage medium is further configured to store program code used to perform the following steps: obtaining original color attribute values, the color attribute values including: red, green, or blue; separately inserting the original color attribute values into a sine function to perform stretching, so as to generate stretched color attribute values; and separately forming the stretched left eye area and the stretched right eye area according to the stretched color attribute values.

Optionally, the storage medium is further configured to store program code used to perform the following steps: performing detection on the photograph to determine a position of the human face; and detecting face attributes according to the position of the human face, the face attributes including: gender, age, expression, posture, or glasses.

Optionally, the storage medium is further configured to store program code used to perform the following steps: locating facial features of the human face and calculating contour points constituting the human face; and extracting contour points of a left eye and contour points of a right eye from the contour points.

Optionally, the storage medium is further configured to store program code used to perform the following steps: displaying an operation interface of the processing method, the operation interface including a select option and a beautify option; selecting the photograph by means of the select option; decoding the selected photograph to generate an RGB format; and starting the face detection on the selected photograph by means of the beautify option.

Optionally, the storage medium is further configured to store program code used to perform the following steps: when the operation interface further includes a save option, encoding, by using the save option, the photograph after the equalization processing, so as to generate a JPEG format photograph file.

Figure 8:
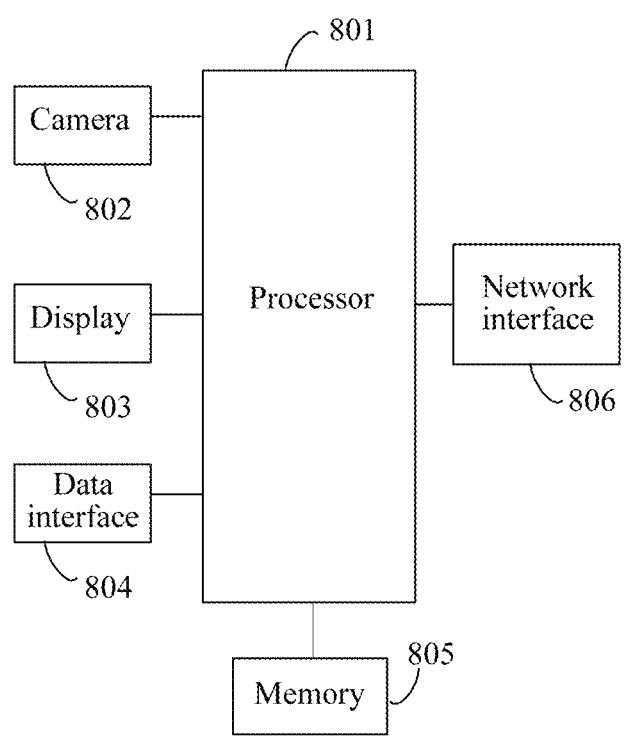
FIG. 8 is a schematic diagram of a terminal according to an embodiment of the present invention.

The embodiments of the present invention further provide a terminal for implementing the foregoing photograph processing method. As shown in FIG. 8, the terminal mainly includes a processor 801, a camera 802, a display 803, a data interface 804, a memory 805, and a network interface 806.

The camera 802 may be configured to take a photograph containing a human face. The data interface 804 may transmit a photograph of a human face taken by a third-party tool to the processor 801 by means of data transmission.

The memory 805 may be configured to store the photograph of the human face taken by camera 802 or the photograph of the human face shot by the third-party tool. The network interface 806 may be configured to perform network communication with a server. The display 803 may be configured to display a processed photograph of the human face and an operation interface.

The processor 801 is mainly configured to execute the following operations: performing face detection on the photograph; performing alignment on a detected human face, so as to obtain contour points of two eyes; separately calculating a left eye area and a right eye area according to the contour points of the two eyes; performing stretching transformation on each pixel in the left eye area and the right eye area; and performing histogram equalization processing on a stretched left eye area and a stretched right eye area, so as to generate a processed photograph.

The processor 801 is further configured to perform stretching transformation on each pixel in the left eye area and the right eye area, including: decomposing each pixel in the left eye area and the right eye area into a red attribute value, a green attribute value, and a blue attribute value; and performing stretching transformation on the red attribute value, the green attribute value, and the blue attribute value to generate a stretched left eye area and a stretched right eye area.

The processor 801 is further configured to: obtain original color attribute values, the color attribute values including: red, green, or blue; separately insert the original color attribute values into a sine function to perform stretching, so as to generate stretched color attribute values; and separately form the stretched left eye area and the stretched right eye area according to the stretched color attribute values.

The processor 801 is further configured to: perform detection on the photograph to determine a position of the human face; and detect face attributes according to the position of the human face, the face attributes including: gender, age, expression, posture, or glasses.

The processor 801 is further configured to: locate facial features of the human face and calculate contour points constituting the human face; and extract contour points of a left eye and contour points of a right eye from the contour points.

The processor 801 is further configured to: display an operation interface of the processing method, the operation interface including a select option and a beautify option; select the photograph by means of the select option; select the photograph by means of the select option; decode the selected photograph to generate an RGB format; and start the face detection on the selected photograph by means of the beautify option.

The operation interface further includes a save option, and the processor 801 is further configured to encode, using the save option, the photograph after the equalization processing, so as to generate a JPEG format photograph file.

The photograph processing system and processing method provided in the embodiments of the present invention are based on the same concept. For the specific implementation process, refer to the whole specification, and details are not described herein again, and features and elements in various embodiments may be replaced or combined with other another.

Thus, the present disclosure has been disclosed through preferred embodiments, but the preferred embodiments are not intended to limit the present disclosure, and a person of ordinary skill in the art can make various modifications and improvements without departing from the spirit and scope of the present disclosure; therefore, the protection scope of the present disclosure should be subject to the scope defined by the claims.

What is claimed is:

1. A photograph processing method, comprising:
   performing face detection on a photograph to obtain a detected human face;
   performing alignment on the detected human face, so as to obtain contour points of a left eye and a right eye of the detected human face;
   separately calculating a left eye area, being an area of the left eye, and a right eye area, being an area of the right eye, according to the contour points of the left eye and the right eye;
   performing color-stretching transformation on each pixel in the left eye area and the right eye area to generate a color-stretched left eye area and a color-stretched right eye area, comprising:
      decomposing each pixel in the left eye area and the right eye area into a plurality of color attribute values corresponding to a plurality of color channels of the photograph, wherein each color attribute value of a pixel corresponds to one color channel; and
      performing color-stretching transformation on each pixel by adjusting the color attribute values of each pixel using a transformation function to generate the color-stretched left eye area and the color-stretched right eye area, wherein the transformation function is configured to recolor a center area of an eye by scaling up the corresponding color attribute values and recolor an edge area of the eye by scaling down the corresponding color attribute values so that the left eye and the right eye appear rounder and brighter; and performing histogram equalization processing on the color-stretched left eye area and the color-stretched right eye area, so as to generate a processed photograph.

2. The processing method according to claim 1, wherein the performing stretching transformation on each pixel in the left eye area and the right eye area comprises:
decomposing each pixel in the left eye area and the right eye area into a red attribute value, a green attribute value, and a blue attribute value; and
performing the color-stretching transformation on the red attribute value, the green attribute value, and the blue attribute value of each pixel to generate the color-stretched left eye area and the color-stretched right eye area.

3. The processing method according to claim 2, wherein the performing the color-stretching transformation on the red attribute value, the green attribute value, and the blue attribute value to generate the color-stretched left eye area and the color-stretched right eye area comprises:
separately inserting the red attribute value, the green attribute value, and the blue attribute value into the transformation function to perform stretching, so as to generate color-stretched color attribute values; and
separately forming the color-stretched left eye area and the color-stretched right eye area according to the color-stretched color attribute values.

4. The processing method according to claim 1, wherein the performing face detection on a photograph comprises:
performing detection on the photograph to determine a position of the detected human face; and
detecting face attributes according to the position of the detected human face.

5. The processing method according to claim 1, wherein the performing alignment on the detected human face comprises:
locating facial features of the detected human face and calculating contour points constituting the detected human face; and
extracting contour points of the left eye and contour points of the right eye from the contour points.

6. The processing method according to claim 5, wherein, before performing face detection on a photograph, the processing method further comprises:
displaying an operation interface having at least a select option and a beautify option;
selecting the photograph using the select option;
decoding the photograph to generate an RGB format photograph; and
starting the face detection on the photograph using the beautify option.

7. The processing method according to claim 6, wherein the operation interface further includes a save option and, after the performing histogram equalization processing on the color-stretched left eye area and the color-stretched right eye area, the processing method further comprises:
encoding, using the save option, the processed photograph to generate a JPEG format file.

8. The processing method according to claim 1, wherein the transformation function is uniform for the color attribute values corresponding to all color channels of the pixels in the left eye area and the right eye area.

9. The processing method according to claim 1, wherein the transformation function is a sinusoidal function.

10. A photograph processing system, comprising:
a memory storing instructions; and
a processor coupled to the memory and, when executing the instructions, configured for:
performing face detection on a photograph to obtain a detected human face;
performing alignment on the detected human face, so as to obtain contour points of a left eye and a right eye of the detected human face;
separately calculating a left eye area, being an area of the left eye, and a right eye area, being an area of the right eye, according to the contour points of the left eye and the right eye;
performing color-stretching transformation on each pixel in the left eye area and the right eye area to generate a color-stretched left eye area and a color-stretched right eye area, comprising:
decomposing each pixel in the left eye area and the right eye area into a plurality of color attribute values corresponding to a plurality of color channels of the photograph, wherein each color attribute value of a pixel corresponds to one color channel; and
performing color-stretching transformation on each pixel by adjusting the color attribute values of each pixel using a transformation function to generate the color-stretched left eye area and the color-stretched right eye area, wherein the transformation function is configured to recolor a center area of an eye by scaling up the corresponding color attribute values and recolor an edge area of the eye by scaling down the corresponding color attribute values so that the left eye and the right eye appear rounder and brighter; and
performing histogram equalization processing on the color-stretched left eye area and the color-stretched right eye area, so as to generate a processed photograph.

11. The photograph processing system according to claim 10, wherein the performing stretching transformation on each pixel in the left eye area and the right eye area comprises:
decomposing each pixel in the left eye area and the right eye area into a red attribute value, a green attribute value, and a blue attribute value; and
performing the color-stretching transformation on the red attribute value, the green attribute value, and the blue attribute value of each pixel to generate the color-stretched left eye area and the color-stretched right eye area.

12. The photograph processing system according to claim 11, wherein the performing the color-stretching transformation on the red attribute value, the green attribute value, and the blue attribute value to generate the color-stretched left eye area and the color-stretched right eye area comprises:
separately inserting the red attribute value, the green attribute value, and the blue attribute value into the transformation function to perform stretching, so as to generate color-stretched color attribute values; and
separately forming the color-stretched left eye area and the color-stretched right eye area according to the color-stretched color attribute values.

13. The photograph processing system according to claim 10, wherein the performing face detection on a photograph comprises:
performing detection on the photograph to determine a position of the detected human face; and
detecting face attributes according to the position of the detected human face.

14. The photograph processing system according to claim 10, wherein the performing alignment on the detected human face comprises:
locating facial features of the detected human face and calculating contour points constituting the detected human face; and
extracting contour points of the left eye and contour points of the right eye from the contour points.

15. The photograph processing system according to claim 14, wherein, before performing face detection on a photograph, the processor is further configured for:
displaying an operation interface having at least a select option and a beautify option;
selecting the photograph using the select option;
decoding the photograph to generate an RGB format photograph; and
starting the face detection on the photograph using the beautify option.

16. The photograph processing system according to claim 15, wherein the operation interface further includes a save option and, after the performing histogram equalization processing on the color-stretched left eye area and the color-stretched right eye area, the processor is further configured for:
encoding, using the save option, the processed photograph to generate a JPEG format file.

17. A non-transitory computer-readable storage medium containing computer-executable instructions for, when executed by a processor, performing a photograph processing method, the method comprising:
performing face detection on a photograph to obtain a detected human face;
performing alignment on the detected human face, so as to obtain contour points of a left eye and a right eye of the detected human face;
separately calculating a left eye area, being an area of the left eye, and a right eye area, being an area of the right eye, according to the contour points of the left eye and the right eye;
performing color-stretching transformation on each pixel in the left eye area and the right eye area to generate a color-stretched left eye area and a color-stretched right eye area, comprising:
decomposing each pixel in the left eye area and the right eye area into a plurality of color attribute values corresponding to a plurality of color channels of the photograph, wherein each color attribute value of a pixel corresponds to one color channel; and
performing color-stretching transformation on each pixel by adjusting the color attribute values of each pixel using a transformation function to generate the color-stretched left eye area and the color-stretched right eye area, wherein the transformation function is configured to recolor a center area of an eye by scaling up the corresponding color attribute values and recolor an edge area of the eye by scaling down the corresponding color attribute values so that the left eye and the right eye appear rounder and brighter; and
performing histogram equalization processing on the color-stretched left eye area and the color-stretched right eye area, so as to generate a processed photograph.

18. The non-transitory computer-readable storage medium according to claim 17, wherein the performing face detection on a photograph comprises:
performing detection on the photograph to determine a position of the detected human face; and
detecting face attributes according to the position of the detected human face.

19. The non-transitory computer-readable storage medium according to claim 17, wherein the performing alignment on the detected human face comprises:
locating facial features of the detected human face and calculating contour points constituting the detected human face; and
extracting contour points of the left eye and contour points of the right eye from the contour points.

20. The non-transitory computer-readable storage medium according to claim 19, wherein, before performing face detection on a photograph, the method further comprises:
displaying an operation interface having at least a select option and a beautify option;
selecting the photograph using the select option;
decoding the photograph to generate an RGB format photograph; and
starting the face detection on the photograph using the beautify option.

* * * * *